(12) United States Patent
Sornin

(10) Patent No.: US 8,331,880 B2
(45) Date of Patent: Dec. 11, 2012

(54) TRANSMITTER WITH SELF-TEST CAPABILITY

(75) Inventor: Nicolas Sornin, La Tronche (FR)

(73) Assignee: Cambridge Silicon Radio Limited, Cambridge (GB)

( * ) Notice: Subject to any disclaimer, the term of this patent is extended or adjusted under 35 U.S.C. 154(b) by 360 days.

(21) Appl. No.: 12/759,365

(22) Filed: Apr. 13, 2010

(65) Prior Publication Data

US 2011/0098012 A1    Apr. 28, 2011

(30) Foreign Application Priority Data

Apr. 14, 2009 (GB) .................................. 0906417.1

(51) Int. Cl.
  *H04B 17/00* (2006.01)
  *H04B 1/04* (2006.01)
(52) U.S. Cl. .................. 455/115.1; 455/114.2
(58) Field of Classification Search ............ 455/91, 455/127.1, 115.2, 114.2, 115.1
  See application file for complete search history.

(56) References Cited

U.S. PATENT DOCUMENTS

| | | | |
|---|---|---|---|
| 6,816,987 B1* | 11/2004 | Olson et al. .................. 714/704 |
| 6,834,258 B2* | 12/2004 | Schulte et al. ................. 702/183 |
| 6,977,960 B2* | 12/2005 | Takinosawa .................. 375/224 |
| 7,324,913 B2* | 1/2008 | Clark et al. .................... 702/122 |
| 7,409,194 B2* | 8/2008 | Shi et al. ........................ 455/126 |
| 7,937,050 B2* | 5/2011 | Chen ........................... 455/115.1 |
| 8,010,064 B2* | 8/2011 | Kim et al. ................... 455/115.2 |
| 8,219,047 B2* | 7/2012 | Camuffo et al. ............. 455/127.1 |
| 2004/0193982 A1* | 9/2004 | Bhora et al. .................... 714/726 |
| 2009/0067351 A1 | 3/2009 | Wiesbauer et al. |

FOREIGN PATENT DOCUMENTS

DE  10 2008 039 783 A1  3/2009

OTHER PUBLICATIONS

German Patent Office action dated Apr. 4, 2011 (English translation).

* cited by examiner

*Primary Examiner* — Sonny Trinh
(74) *Attorney, Agent, or Firm* — Novak Druce DeLuca + Quigg LLP

(57) ABSTRACT

A radio transmitter includes a transmitter circuit having a transmission output and being configured to generate at the transmission output a signal for transmission; a reference voltage circuit configured to generate a substantially temperature-invariant reference voltage; a reference signal circuit having a reference output and being configured to receive the substantially temperature-invariant voltage generated by the reference voltage circuit and to generate at the reference output an oscillating reference signal of an amplitude that is derived from the temperature-invariant reference voltage; an amplitude sensor having an input and being configured for sensing the amplitude of a signal at the input and generating a sensed amplitude signal indicative of the sensed amplitude; and control apparatus configured to control the radio transmitter to operate in each of: a) a first mode in which it causes the input of the amplitude sensor to be coupled to the reference output; and b) a second mode in which it causes the input of the amplitude sensor to be coupled to the transmission output.

17 Claims, 2 Drawing Sheets

TRANSMITTER WITH SELF-TEST CAPABILITY

BACKGROUND OF THE INVENTION

This invention relates to radio transmitters.

In order to limit the potential for interference between radio systems that occupy nearby or overlapping frequency bands, regulatory authorities stipulate limits on the radiation that can be transmitted from certain transmitters. Those limits may include upper and lower frequency bounds, an upper instantaneous power limit or an upper time-averaged power limit.

Among a batch of mass-produced radio transmitters there may be variation in performance due to process variations during manufacture. In particular, the size of the power amplifying transistors can vary with a range of around ±2 dB. The performance of devices also varies with temperature. These factors lead to differences in transmit power between apparently similar devices. In order to ensure that all of a manufacturer's devices will meet regulated power limits, the manufacturer will normally design his transmitters to operate somewhat below the power limits so that even those devices that are at the extremes of performance will still comply with the regulations.

The UWB radio system has especially strict power limits. The regulations for the UWB radio system require that the transmitted power from a UWB device must not exceed −41 dBm/MHz averaged over any 10 ms timeframe. The UWB protocol uses 1.5 GHz bands, so that regulated power limit equates to −10 dBm over the 1.5 GHz band. That is a very low figure compared to typical radio systems. The UWB power limit is so low that if a manufacturer were to adopt the normal approach of designing products to a significantly lower power limit than the regulated limit, the resulting drop in power output would result in a serious reduction in the devices' usable range. There is therefore a need for an alternative way of ensuring that the power limit is met.

One way to increase the effective power of UWB devices is to design them to tighter tolerances. This reduces the leeway that is needed below the power limit in order to ensure that the devices meet the power requirement. However, this approach increases the cost of the devices.

Another way to increase the effective power is to calibrate each device at manufacture. Again, this increases the devices' cost.

Alternatively, it is known for devices to perform self-testing with the aim of regulating their own power. The difficulty with this approach is that in order for the manufacturer to be certain that the self-calibration process will result in the device meeting the legal power limits the self-calibration must be performed accurately. But for the same reasons that the transmitters' outputs can vary between devices, the accuracy of the components that perform calibration can also vary between devices. Also, the performance of both the transmitter and the calibration components can vary with temperature.

There is a need for an alternative way to allow a transmitter to run close to a regulated power limit, or in general to operate at a well-defined output power.

SUMMARY OF THE INVENTION

According to one aspect of the present invention there is provided a radio transmitter comprising: a transmitter circuit having a transmission output and being configured to generate at the transmission output a signal for transmission; a reference voltage circuit configured to generate a substantially temperature-invariant reference voltage; a reference signal circuit having a reference output and being configured to receive the substantially temperature-invariant voltage generated by the reference voltage circuit and to generate at the reference output an oscillating reference signal of an amplitude that is derived from the temperature-invariant reference voltage; an amplitude sensor having an input and being configured for sensing the amplitude of a signal at the input and generating a sensed amplitude signal indicative of the sensed amplitude; and control apparatus configured to control the radio transmitter to operate in each of: a) a first mode in which it causes the input of the amplitude sensor to be coupled to the reference output; and b) a second mode in which it causes the input of the amplitude sensor to be coupled to the transmission output.

According to a second aspect of the present invention there is provided method for operating a radio transmitter, the transmitter comprising: a transmitter circuit having a transmission output and being configured to generate at the transmission output a signal for transmission; the method comprising: generating a substantially temperature-invariant reference voltage by means of a reference voltage circuit; generating at a reference signal output an oscillating reference signal of an amplitude that is derived from the temperature-invariant reference voltage by means of a reference signal circuit; and in a first mode of operation sensing by means of an amplitude sensor the signal at the reference output; and in a second mode of operation sensing by means of the amplitude sensor signal at the transmission output.

The control apparatus may be configured to receive the sensed amplitude signal.

The control apparatus may be configured to calibrate the amplitude sensor when the radio transmitter is operating in the first mode.

The control apparatus may be configured to control the radio transmitter to operate in: c) a third mode in which it causes the output of the transmitter to be coupled to an antenna output for to transmit the signal for transmission.

The control apparatus may be configured to: when the radio transmitter is operating in the second mode, estimate by means of the sensed amplitude signal the output of the transmitter circuit; and subsequently adjust, in dependence on the estimated output of the transmitter circuit when the radio transmitter is operating in the second mode, the output of the radio transmitter when it is operating in the third mode.

The transmitter circuit may comprise a power amplifier. The control apparatus may be configured to adjust, in dependence on the estimated output of the transmitter circuit when the radio transmitter is operating in the second mode, a bias input of the amplifier so as to influence the degree of amplification applied by the amplifier.

The control apparatus may be configured to adjust the output of the radio transmitter when it is operating in the third mode so as to maintain the output below a pre-set power threshold.

The control apparatus may be configured to calibrate the amplitude sensor when the radio transmitter is operating in the first mode prior to estimating by means of the sensed amplitude signal the output of the transmitter circuit.

The control apparatus may be configured to, when the radio transmitter is operating in the second mode, estimate by means of the sensed amplitude signal the output of the transmitter circuit in accordance with the calibrated sensitivity of the amplitude detector.

The reference signal circuit may be a bandgap reference signal circuit.

The reference signal circuit may comprise a switch for switching the reference output between a first voltage that is derived from the temperature-invariant reference voltage, and a second voltage to thereby form the oscillating reference signal.

The second voltage may be ground.

The reference signal circuit may comprise a potential divider having one end connected to ground, another end connected to receive the temperature-invariant reference voltage, and a tap that provides the first voltage.

The control apparatus may comprise a memory storing a definition of the sensitivity of the amplitude sensor over a range of one or more of temperature, frequency and amplitude relative to the performance of the transmitter circuit. The control apparatus may be configured to control the gain of the transmitter circuit in dependence on the output of the amplitude sensor in the second mode as moderated in accordance with the said definition.

The transmitter may be configured to operate in accordance with a radio protocol that is limited to a power output of −5 dBm or less over at least part of its main signal-carrying band.

The transmitter may be an ultra wideband transmitter.

BRIEF DESCRIPTION OF THE DRAWINGS

The present invention will now be described by way of example with reference to the accompanying drawings, wherein.

DETAILED DESCRIPTION OF THE INVENTION

As indicated above, a principal problem in having a circuit make an estimate of its own output power that is substantially temperature-independent and process-independent is that the performance of the part of the circuit that forms the estimate may itself vary with temperature and process. In the circuit to be described below this problem is addressed by calibrating the estimation circuit using a voltage generated substantially independently of temperature and process, for example the bandgap voltage of the semiconductor on which the circuit or part of it is formed. In a first mode, a signal detector is calibrated by means of an oscillating signal generated from a temperature-invariant reference voltage. In a second mode, that calibrated signal detector is used to measure the output of the transmitter. Finally, in a third, operational mode, the transmitter is operated for transmission using a bias or other adjustment determined as a result of the calibration performed in the test mode so as to generate a desired output power.

Figure 1:
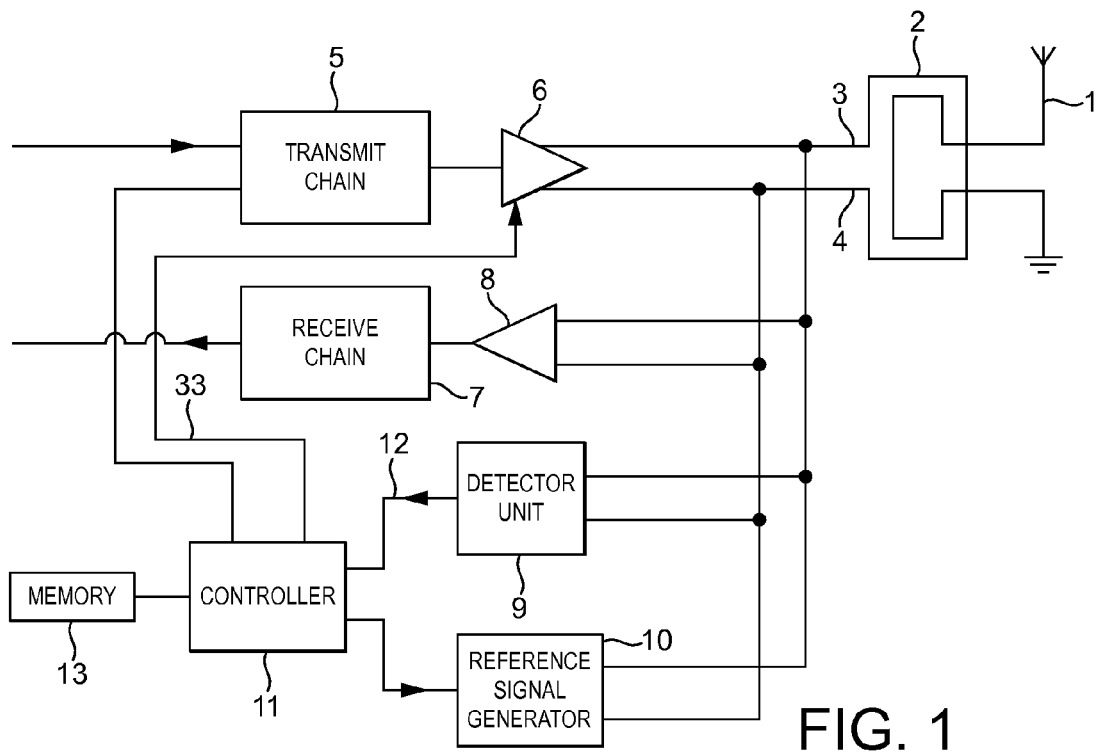
FIG. 1 is a schematic diagram of a radio transceiver.

FIG. 1 shows the general architecture of a radio transceiver. An antenna 1 is coupled by a balun transformer 2 to rails 3, 4. Four components are coupled in parallel between those rails:
 a transmit chain 5 which terminates in a power amplifier 6;
 a receive chain 7 which commences with a receive amplifier 8;
 a detector unit 9; and
 a reference signal generator 10.

A controller 11 controls the operation of the reference generator 10 and sets the operation of the power amplifier 6 independence on calibration data derived from the detector unit 9. In practice, the controller function may be provided by a single dedicated unit, or could be implemented by software running on a processor, or could be split between multiple hardware components.

The detector 9 is coupled to controller 11 by line 12. The detector measures the instantaneous voltage across the rails 3, 4 and reports a digital value that is indicative of that voltage to the controller. The detector may be an analogue-to-digital converter (ADC), optionally with a suitable amplifier and/or filter at its input. In any particular manufactured implementation of the circuit the digital value may be generated from A-to-D conversion of an input value that is dependent in a substantially deterministic way on the voltage across the rails. However, in addition to being dependent on that voltage, the digital value may be expected also to depend on other factors, such as (a) the temperature of the detector and any amplifier or filter at its input and (b) the inherent characteristics of the electronic devices of which the particular implementation of the detector is composed. Those device characteristics may differ from one circuit to another due to manufacturing variations.

In order for the output of the detector to be used for adjusting the power output of the transmitter the detector must first be calibrated to account for major factors in its variability. The calibration is performed under the control of the controller 11. The controller 11 may be programmed with information that defines the times at when the detector is to be calibrated. The programme could be stored in memory 13. The detector could, for example, be calibrated only once, when the circuit is first powered up; or alternatively every time the circuit is powered up; or alternatively immediately before each operation to set the adjustment(s) to be applied to the amplifier 6. The results of a calibration could be stored by the controller in memory 13 for later use.

Figure 2:
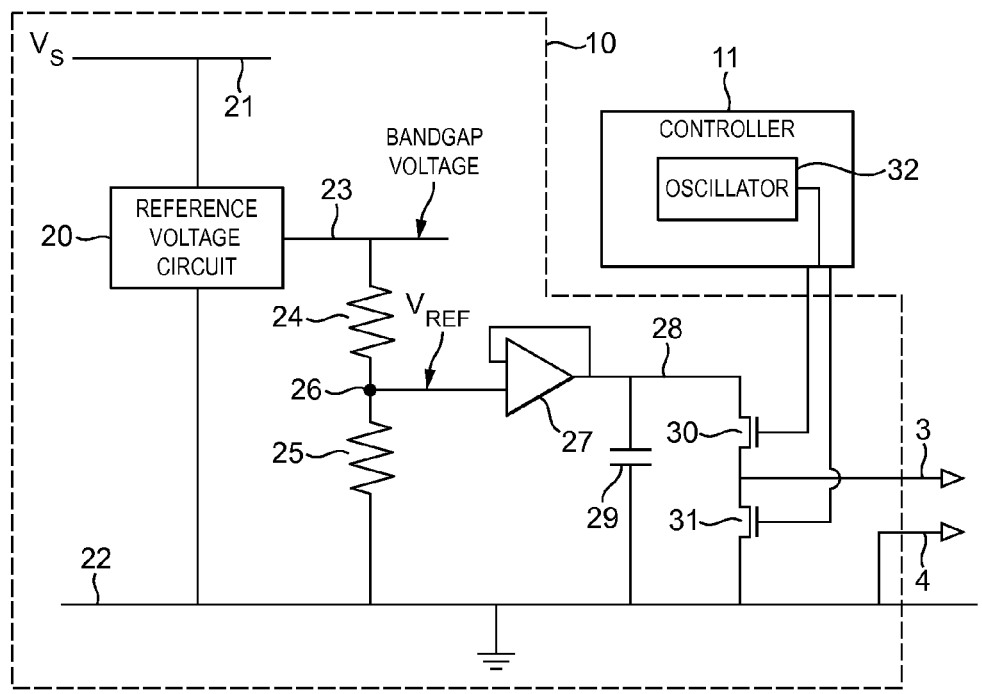
FIG. 2 shows a circuit for generating a reference signal.
Figure 3:
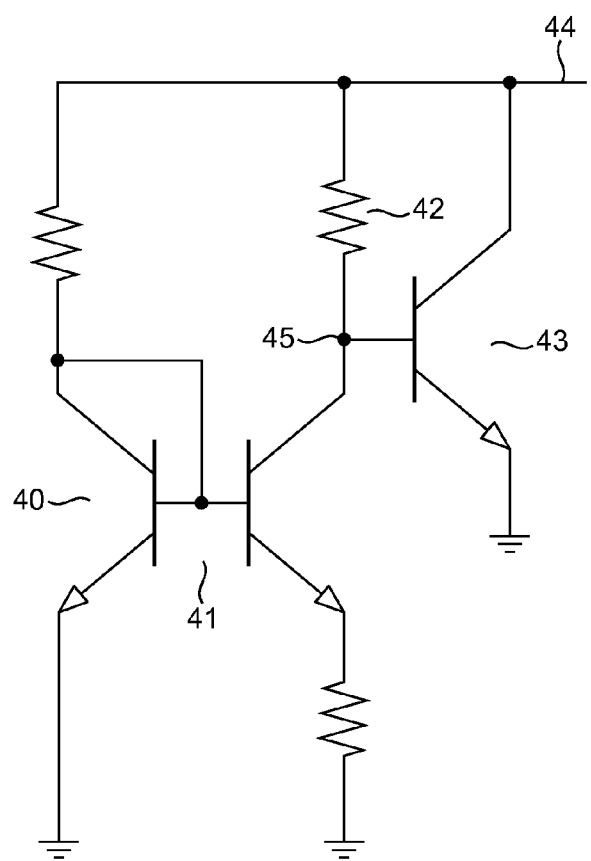
FIG. 3 shows a circuit for generating a reference voltage.

FIG. 2 shows in more detail an example of a circuit that can be used for the reference signal generator 10. A reference voltage circuit 20 is connected between the circuit supply voltage 21 and ground 22. The reference voltage circuit is configured to generate a temperature-independent reference voltage at 23. One way in which the reference voltage can be generated is by means of a circuit whose output is locked to the bandgap voltage of the semiconductor on which it is implemented. One example of such a circuit is shown in FIG. 3. It employs a current mirror comprising two transistors 40, 41 operating at different emitter current densities, the output node 45 of which is converted to a voltage by passing through a resistor 42. A further transistor 43 is switched by that current to generate the constant voltage output at 44. Such bandgap voltage reference circuits are well-known, and are described (for instance) at pp 355-358 of The Art of Electronics, Horowitz & Hill, 2nd edition. As an alternative to generating the reference voltage in a temperature-compensated manner, the reference voltage could be generated in a way that varies in a known manner with temperature, and the control circuit 11 could compensate for temperature variation in the output of the detector 9 before adjusting the operation of the amplifier 6. In the present example, the reference voltage circuit generates a temperature-independent voltage at 23 which is equal to the bandgap voltage of silicon, the reference voltage circuit being manufactured on a silicon substrate.

In order to best calibrate the detector 9 it is preferred to use a reference voltage that is close to the mid-range output voltage of the amplifier 6, or that will cause the peaks of the reference signal to have a voltage that is around the mid-range of the analogue-to-digital converter of the detector 9. To achieve this, the reference voltage at 23 is put across a potential divider comprising two resistors 24, 25 connected in series between ground 22 and the output 23 of the reference voltage circuit 20. The resistors are in known ratio to each other and the voltage at 23 is known, so the voltage at the node 26 between the resistors is also known. The ratio of the resistors is selected so that the desired test voltage is achieved at node 26. This could, for example be 300 mV. The resistances of the resistors 24, may vary due to process variations, but the ratio between the resistors, and therefore the voltage at node 26 will be expected to be substantially process-independent.

The test voltage at node 26 could be used directly to generate the oscillating test signal. More preferably the voltage at node 26 is applied to the non-inverting input of an operational amplifier 27, with the output of the amplifier being fed back to the inverting input so that the amplifier acts as a current source at the test voltage. The output 28 of the amplifier 27 is smoothed by a capacitor 29 coupled between the output and ground.

The reference signal generator has two outputs which are connected to rails 3, 4 respectively. The output to rail 4 is connected to ground 22. A switch mechanism allows the oscillating output to be formed. A first switch 30 is connected between amplifier output 28, which is at the test voltage, and the output to rail 3 so that rail 3 can be selectively connected to output 28. A second switch 31 is connected between ground and the output to rail 3 so that rail 3 can be selectively connected to ground. The switches could be transistors. By means of the switches 30, 31 the controller 11 can connect rail 3 either to the test voltage or to ground.

When the reference signal generator 10 is inactive the controller controls the switches 30, 31 to both be off, so as to decouple rail 3 from the reference signal generator. By means of another switch (not shown) the controller may also disconnect rail 4 from ground 22 when signal generator 10 is inactive. When the reference signal generator is active the controller 11 controls the switches 30, 31 in dependence on an oscillator 32 so as to switch on alternately at the oscillation frequency. When one switch is on the other is off. The oscillator is illustrated in FIG. 2 as being a part of the controller 11, but the oscillator could be external to the controller and the controller could receive an oscillating input that is used to control the switches 30, 31. The controller could include a frequency divider to divide down a received frequency to a desired frequency for testing purposes. Since the switches 30, 31 are activated alternately, rail 3 swings from ground to the known test voltage at the frequency of the oscillator 32. That output signal is used to calibrate the detector 9.

When the controller 11 is to calibrate the detector 9 it activates the reference signal generator. In the simplest form, the calibration involves forming a single oscillating signal of known frequency and peak amplitude by means of the reference signal generator 10 in the manner described above. That signal will be received by the detector 9 via rails 3, 4 and the detector will generate a digital value that it will return to the controller 11. The expected variation of the digital value with signal amplitude may be known from theory or testing of sample devices. That curve or a mathematical definition of it can be stored in memory 13. The expected variation of the digital value with frequency may also be known from theory or testing of sample devices. That curve or a mathematical definition of it can also be stored in memory 13. Using those stored curves the offset between the detected value and the predicted value can be used to determine an offset that represents a calibration value for the detector.

As an illustration of this, the system may operate as follows. The variation of the digital output value with frequency and amplitude may be given by the function g(f,a), where f is the frequency input to the detector, a is the amplitude input to the detector and g(f,a) is the expected output of an arbitrary "ideal" detector at that frequency and amplitude. A definition of g(f,a) is stored, for example as a look-up table, in memory 13. The reference signal generator 10 generates a signal of amplitude $a_{ref}$ and frequency $f_{ref}$. In response the detector generates a digital value $v_{ref}$. The controller determines a value d equal to $g(f_{ref},a_{ref})-v_{ref}$. The value d is stored in memory 13 as the calibration value. It can subsequently be used to correct measurements made by the detector. If the detector subsequently outputs a digital value $v_{test}$ for an input signal at a known frequency $f_{test}$, the actual voltage received at the detector can be estimated as the value of $a_{test}$ that satisfies the relationship $d=g(f_{test},a_{test})-v_{test}$.

The performance of the detector may vary with frequency. If the variation of d with frequency is predictable then a definition of that variation could be stored in memory 13. Subsequently, once a value of d has been determined in the fashion described above, that definition can be used by the controller to derive other values of d for use at other frequencies. Alternatively, depending on the performance of the detector, and its variability between devices, it may be desirable to test the detector at a range of input frequencies (by adjusting oscillator 32). The resulting testing will yield a matrix of values of d that can be stored and between which other expected values of d can be interpolated as necessary. The frequencies could be swept over a frequency range that matches the operational frequency range of the transmitter.

Once one or more values of d have been determined, they are stored in memory 13 for use until the detector is next calibrated.

When full power is demanded by the transmitter 5 the amplifier 6 will generate an output of a certain amplitude. In addition to depending on the power demand signalled by the transmitter 5, that amplitude may also be dependent on the frequency at which the transmitter is operating, due to the inherent performance characteristics of the amplifier.

Once the detector 9 has been calibrated it can be used to calibrate the amplifier 6.

The controller 11 is pre-programmed with the response characteristics of the balun 2 and the antenna 1, so that it can estimate what transmit power will be emitted by the antenna for a given frequency and signal amplitude output by the amplifier 6. That information is stored in memory 13, for example in the form of a look-up table. To calibrate the amplifier the controller 11 turns the reference signal generator 10 off and commands the transmitter 5 to operate in a test mode. In the test mode the transmitter generates a signal at a known frequency, that frequency being commanded by the controller 11, and at a proportion of full transmitter power demand that is commanded by the controller. The resulting signal is received at detector 9 and a resulting digital value is reported to the controller 11. That digital value is analysed by the controller 11 to accurately estimate the amplitude being output by the amplifier 6. The controller 11 moderates the digital value in accordance with the calibration value or matrix determined as described above in order to estimate the actual amplitude at the input to the detector. Once that amplitude is known, the controller can, using the data stored in the memory 13 defining the characteristics of the balun and the antenna, predict the power that would be transmitted for an amplifier output of that amplitude and at that frequency.

The controller 11 is pre-programmed with one or more limits defining a window of desired output power level of the transmitter. That could, for example, be from −10.02 dBm to −10.06 dBm. Having predicted the power that would be transmitted for the tested output amplitude and frequency the controller checks whether that output is within the desired range. If it is not then it estimates a bias adjustment that it can apply to the amplifier 6 via line 33 to bring the output power into range. Subsequently, when the transmitter is in operation the transmitter 5 signals the controller 11 with the frequency at which it is operating. In response the controller 11 applies the pre-estimated bias to the amplifier with the aim of bringing the output power into the desired range. This is continued as the transceiver operates for transmission. The pre-estimated bias values can be determined for a range of transmission frequencies by testing the amplifier at a range of frequencies. For example, the amplifier could be tested every 2 to 3 MHz across the spectrum of interest. The resulting values can be stored in memory 13 and recalled by the controller 11 during transmission. Preferably the memory 13 is a non-volatile memory, so that these values will still be retained if the device is turned off.

The desired power level will typically be such that at full power demand the transmitter operates just inside the maximum permitted power output for the communication system in question.

As indicated above, one way for the controller 11 to control the desired output power is for the controller to apply a biasing signal via line 33 to the amplifier. Alternatively, the controller 11 could signal the transmitter 5 to adjust its power demands to the amplifier to have the desired effect on output power.

As indicated above, the biasing or other adjustment may vary depending on the output frequency. Alternatively, if the performance of the amplifier is substantially invariant with frequency then a single adjustment could be used over the whole frequency range. In that case, the amplifier could be tested at just one frequency.

The adjustment to the output power that is imposed by the controller 11 may be checked by the controller before the device starts transmission. Once the controller 11 has determined the output amplitude of the amplifier, and has estimated an adjustment that should bring the output power into the window of acceptable output power, the controller can then apply that adjustment (by means of the transmitter 6 or via the bias line 33) and then re-measure the output amplitude to check that the resulting output power would be in the desired range. This may be repeated as required.

Thus, once the performance of the amplifier has been measured by means of the calibrated detector, the controller 11 can estimate one or more adjustments that can be applied to the amplifier to bring its output into a desired range. Those adjustments can be stored. Then when the device is operating for transmission the controller can apply the appropriate adjustment to the transmitter 5 and/or the amplifier 6 to urge the amplifier to operate in the desired power range. That desired power range will typically be such that such that when maximum output power is commanded by the transmitter 5 the output of the amplifier is such as to cause the antenna to emit a signal that is just below the permitted power limit.

The transceiver illustrated in FIG. 1 may be implemented on a single integrated circuit, or it may be implemented partially or wholly using discrete components.

The power measuring and setting technique described above can advantageously be used in wideband systems, such as UWB, but is not restricted to them. It could also be used for narrowband systems.

The controller preferably controls the transmitter and the receiver to be inactive during the calibration mode. The controller preferably causes the transmitter and the detector to be decoupled from the antenna during the testing mode. That may be done by means of additional switches in lines 3, 4.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A radio transmitter comprising:
    a transmitter circuit having a transmission output and being configured to generate at the transmission output a signal for transmission;
    a reference voltage circuit configured to generate a substantially temperature-invariant reference voltage;
    a reference signal circuit having a reference output and being configured to receive the substantially temperature-invariant voltage generated by the reference voltage circuit and to generate at the reference output an oscillating reference signal of an amplitude that is derived from the temperature-invariant reference voltage;
    an amplitude sensor having an input and being configured for sensing the amplitude of a signal at the input and generating a sensed amplitude signal indicative of the sensed amplitude; and
    control apparatus configured to control the radio transmitter to operate in each of:
    a) a first mode in which it causes the input of the amplitude sensor to be coupled to the reference output; and
    b) a second mode in which it causes the input of the amplitude sensor to be coupled to the transmission output.

2. The radio transmitter as claimed in claim 1, wherein the control apparatus is configured to receive the sensed amplitude signal.

3. The radio transmitter as claimed in claim 2, wherein the control apparatus is configured to calibrate the amplitude sensor when the radio transmitter is operating in the first mode.

4. The radio transmitter as claimed in claim 1, wherein the control apparatus is configured to control the radio transmitter to operate in:
    c) a third mode in which it causes the output of the transmitter to be coupled to an antenna output for to transmit the signal for transmission.

5. The radio transmitter as claimed in claim 4, wherein the control apparatus is configured to:
    when the radio transmitter is operating in the second mode, estimate by means of the sensed amplitude signal the output of the transmitter circuit; and subsequently
    adjust, in dependence on the estimated output of the transmitter circuit when the radio transmitter is operating in the second mode, the output of the radio transmitter when it is operating in the third mode.

6. The radio transmitter as claimed in claim 5, wherein the transmitter circuit comprises a power amplifier and the control apparatus is configured to adjust, in dependence on the estimated output of the transmitter circuit when the radio transmitter is operating in the second mode, a bias input of the amplifier so as to influence the degree of amplification applied by the amplifier.

7. The radio transmitter as claimed in claim 5, wherein the control apparatus is configured to adjust the output of the radio transmitter when it is operating in the third mode so as to maintain the output below a pre-set power threshold.

8. The radio transmitter as claimed in claim 5, wherein the control apparatus is configured to calibrate the amplitude sensor when the radio transmitter is operating in the first mode prior to estimating by means of the sensed amplitude signal the output of the transmitter circuit.

9. The radio transmitter as claimed in claim 8, wherein the control apparatus is configured to, when the radio transmitter is operating in the second mode, estimate by means of the sensed amplitude signal the output of the transmitter circuit in accordance with the calibrated sensitivity of the amplitude detector.

10. The radio transmitter as claimed in claim 1, wherein the reference signal circuit is a bandgap reference signal circuit.

11. The radio transmitter as claimed in claim 1, wherein the reference signal circuit comprises a switch for switching the reference output between a first voltage that is derived from the temperature-invariant reference voltage, and a second voltage to thereby form the oscillating reference signal.

12. The radio transmitter as claimed in claim 11, wherein the second voltage is ground.

13. The radio transmitter as claimed in claim 11, wherein the reference signal circuit comprises a potential divider having one end connected to ground, another end connected to receive the temperature-invariant reference voltage, and a tap that provides the first voltage.

14. The radio transmitter as claimed in claim 1, wherein the control apparatus comprises a memory storing a definition of the sensitivity of the amplitude sensor over a range of one or more of temperature, frequency and amplitude relative to the performance of the transmitter circuit, and the control apparatus is configured to control the gain of the transmitter circuit in dependence on the output of the amplitude sensor in the second mode as moderated in accordance with the said definition.

15. The radio transmitter as claimed in claim 1, wherein the transmitter is configured to operate in accordance with a radio protocol that is limited to a power output of −5 dBm or less over at least part of its main signal-carrying band.

16. The radio transmitter as claimed in claim 1, wherein the transmitter is an ultra wideband transmitter.

17. A method for operating a radio transmitter, the transmitter comprising: a transmitter circuit having a transmission output and being configured to generate at the transmission output a signal for transmission; the method comprising:
- generating a substantially temperature-invariant reference voltage by means of a reference voltage circuit;
- generating at a reference signal output an oscillating reference signal of an amplitude that is derived from the temperature-invariant reference voltage by means of a reference signal circuit; and
- in a first mode of operation sensing by means of an amplitude sensor the signal at the reference output; and
- in a second mode of operation sensing by means of the amplitude sensor signal at the transmission output.

\* \* \* \* \*